(12) United States Patent
Payne

(10) Patent No.: US 6,554,935 B1
(45) Date of Patent: Apr. 29, 2003

(54) STRUCTURE FORMING METHOD, APPARATUS AND PRODUCT

(76) Inventor: LeRoy Payne, 4336 Christensen Rd., Billings, MT (US) 59101

(*) Notice: Subject to any disclaimer, the term of this patent is extended or adjusted under 35 U.S.C. 154(b) by 0 days.

(21) Appl. No.: 09/830,327
(22) PCT Filed: Oct. 30, 1998
(86) PCT No.: PCT/US98/23034
§ 371 (c)(1), (2), (4) Date: Apr. 26, 2001
(87) PCT Pub. No.: WO00/64673
PCT Pub. Date: Nov. 2, 2000

(51) Int. Cl.$^7$ .............................................. B32B 31/00
(52) U.S. Cl. ....................... 156/156; 156/287; 156/293; 156/500; 156/71
(58) Field of Search ............................ 156/71, 94, 156, 156/173, 244.13, 287, 293, 294, 500, 538, 547, 550, 549

(56) References Cited

U.S. PATENT DOCUMENTS 3,399,094 A  *  8/1968  Skoggard et al. ............. 156/79
3,520,749 A  *  7/1970  Rubenstein ................. 156/173
3,874,970 A  *  4/1975  Dunn .......................... 156/169
4,976,290 A  * 12/1990  Gelin et al. .................. 138/141

FOREIGN PATENT DOCUMENTS

WO        WO-97/38858 A1  * 10/1997

* cited by examiner

Primary Examiner—Jeff H. Aftergut
(74) Attorney, Agent, or Firm—Arthur L. Urban

(57) ABSTRACT

A method of forming a continuous tubular structure includes preselecting a liquid reactive resin forming material, a particulate solid additive material, a porous tubular blanket and an inflatable bladder member disposed within the blanket. The additive particles are mixed with the liquid resin forming material substantially continuously to form a substantially uniform mixture thereof. Substantially all of the additive particles are encapsulated with the resin forming material. The tubular blanket/bladder combination is advanced through the liquid resin/additive mixture, part of which migrates through the blanket substantially uniformly to form a continuous resin matrix therein. The mixture-treated blanket is advanced along a preselected path, while the bladder therein is inflated to form a tubular structure of a preselected cross section. The structure is placed into a preselected final configuration while it is flexible and has an adhesive outer surface. Apparatus for conducting the above method.

11 Claims, 1 Drawing Sheet

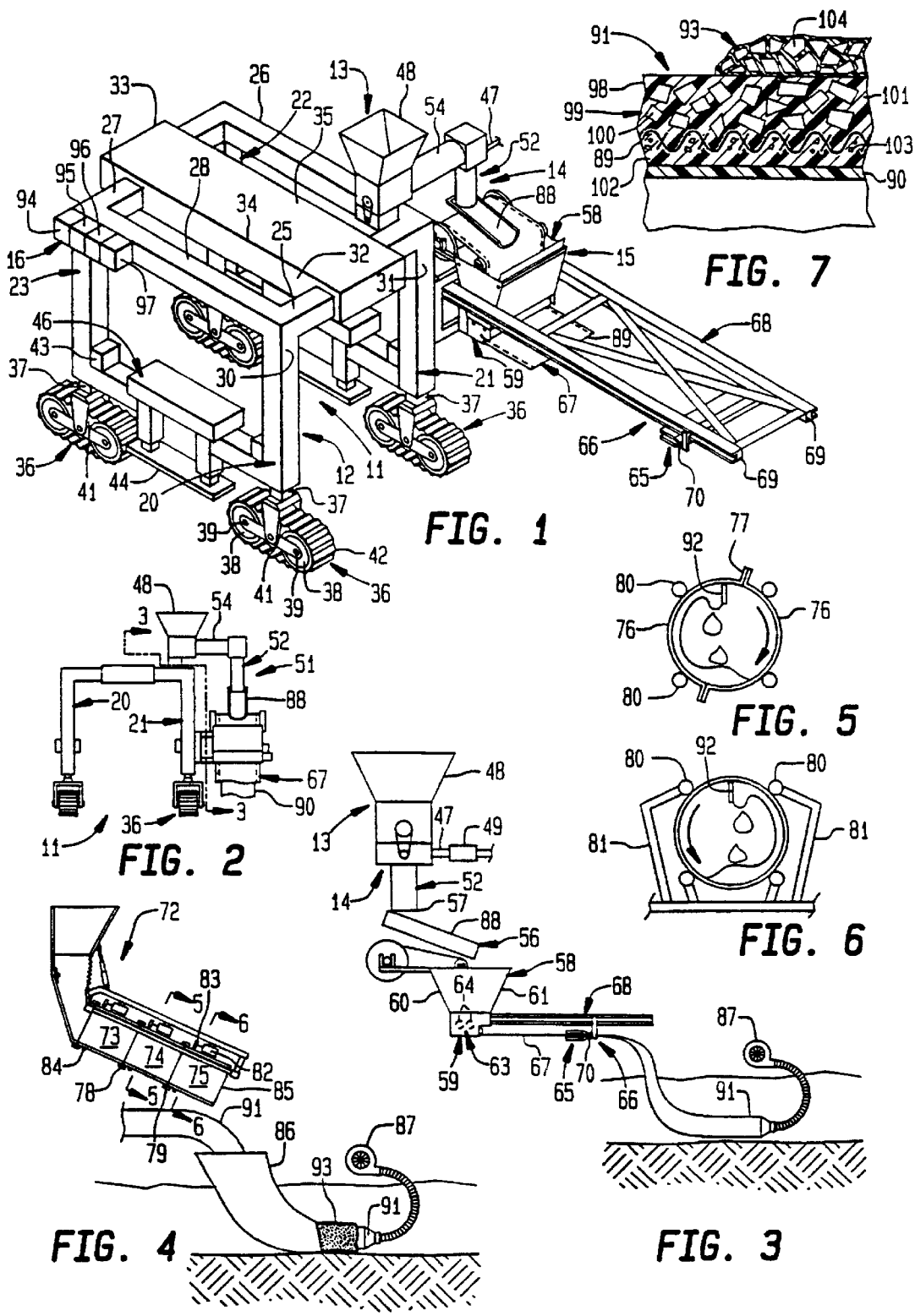

STRUCTURE FORMING METHOD, APPARATUS AND PRODUCT

This application is a continuation-in-part of International application No. PCT/US96/15499, filed Sep. 26, 1996, which in turn is a continuation-in-part of International application No. PCT/US96/05132, filed May 20, 1996, which in turn is a continuation-in-part of International application No. PCT/US95/05450, filed May 4, 1995, now U.S. Pat. No. 5,725,716, which in turn is a continuation-in-part of application Ser. No. 239,540, filed May 9, 1994, now U.S. Pat. No. 5,496,434, which in turn is a continuation-in-part of application Ser. No. 870,927, filed Apr. 20, 1992, now U.S. Pat. No. 5,330,603, which in turn is a continuation-in-part of application Ser. No. 753,344, filed Aug. 30, 1991, now U.S. Pat. No. 5,145,282, which in turn is a continuation-in-part of application Ser. No. 521,442, filed May 10, 1990, now U.S. Pat. No. 5,049,006, which in turn is a continuation-in-part of application Ser. No. 417,501, filed Oct. 5, 1989, now U.S. Pat. No. 4,955,760, which in turn is a continuation-in-part of application Ser. No. 235,205, filed Aug. 23, 1988, now U.S. Pat. No. 4,872,784.

This invention relates to a novel continuous tubular structure forming method and apparatus and to a new continuous tubular structure produced thereby.

The present invention provides a novel method, apparatus and tubular structure which overcome the shortcomings of previous expedients. In addition, the method, apparatus and structure provide features and advantages not found in earlier technology.

The method and apparatus of the present invention may be employed by individuals with only limited mechanical skills and experience. Tubular structures can be produced by such individuals safely and efficiently without supervision utilizing the method and apparatus of the invention. The configuration and composition of the tubular structure can be changed easily. The method of the invention can be modified to form a variety of different tubular structures with the apparatus of the invention. Variations in physical dimensions, composition and surface appearance, etc. can be achieved. Even with such changes, uniform high quality can be maintained without difficulty employing the method and apparatus of the present invention.

A novel method of the present invention for forming a continuous tubular structure includes the steps of preselecting a liquid reactive resin forming material, a. particulate solid additive material, a porous tubular blanket and an inflatable bladder member disposed within the tubular blanket. The additive particles are mixed with the liquid resin forming material substantially continuously to form a substantially uniform mixture thereof. Substantially all of the additive particles are encapsulated with the liquid resin forming material.

The porous blanket/bladder combination is advanced through the resin/additive mixture. Part of the mixture is migrated through the blanket substantially uniformly to form a continuous resin matrix within the blanket.

The mixture-treated blanket is advanced along a preselected path. The bladder member within the treated blanket is inflated to form a bladder-lined tubular structure of a preselected cross section. The inflated tubular structure is placed into a preselected final configuration while the structure is flexible and has an adhesive outer surface.

Advantageously, a second resin/additive mixture is applied to the tubular structure in a preselected thickness. The second mixture preferably is formed by mixing the additive particles with the liquid resin forming material while tumbling the materials along a generally cylindrical path in a preselected orientation. The direction of the tumbling advantageously is reversed as the materials advance along the cylindrical path.

The orientation thereof may be changed along preselected sections of the cylindrical path. The orientation of the mixing sections preferably is monitored and adjusted to maintain it within preselected specifications.

Materials may be added sequentially along preselected sections of the cylindrical path. This is especially useful with multiple component resin forming systems. If desired, pressure may be applied to the tubular structure before its placement in a preselected final configuration.

Benefits and advantages of the novel method, apparatus and tubular structure of the present invention will be apparent from the following description of the accompanying drawings in which:

FIG. 1 is a view in perspective of one form of mobile continuous tubular structure forming apparatus of the present invention;

FIG. 2 is a front view of the tubular structure forming apparatus of the invention shown in FIG. 1;

FIG. 3 is an enlarged fragmentary side view in section of the tubular structure forming apparatus of the invention taken along line 3—3 of FIG. 2;

FIG. 4 is a schematic illustration of another form of mixing and matrix forming portions of the tubular structure forming apparatus of the invention;

FIGS. 5 and 6 are fragmentary cross sectional views taken along lines 5—5 and 6—6 respectively of FIG. 4; and FIG. 7 is a further enlarged fragmentary cross sectional view of the tubular structure of the invention shown in FIG. 1.

As shown in the drawings, one form of novel mobile continuous tubular structure forming apparatus 11 of the present invention includes a supporting portion 12, a raw material supplying portion 13, a mixing portion 14, a matrix forming portion 15 and a control portion 16.

The supporting portion 12 of the tubular structure forming apparatus of the invention includes a plurality of spaced upstanding frame members 20,21,22,23. The frame members are adjustable in length. A plurality of generally horizontally disposed frame sections 25,26,27,28 join adjacent upper ends of the upstanding frame members. For example, as shown in the drawings, frame section 25 extends between an upper end 30 of frame member 20 and an upper end 31 of frame member 21.

Opposed frame sections 25,27 are of adjustable length. This may be accomplished as shown by dividing a frame section into two and partially overlapping adjacent free ends within a housing 32, 33.

Spaced support sections 34,35 extend between opposed frame sections 25,27 and particularly between the respective housing 32 or 33 of each opposed frame section. Components of the material supplying portion 13 as well as other components (not shown) such as an operator's seat, an electrical generator, an air compressor, a hydraulic pump and the like also can be mounted on and/or suspended from the frame sections and support sections.

Pivotable carriage means 36 extend downwardly from lower ends 37 of the upstanding frame members 20–23. Advantageously, the carriage means include wheels 38 rotatable on axles 39. The carriages preferably include variable drive means 41 and include endless track members 42. Drive means 41 advantageously adjust the length of frame members 20–23 and adjustable frame sections 25,27.

The mobile tubular structure forming apparatus 11 advantageously includes four spaced upstanding frame members and four frame sections forming a quadrangular assembly as shown in the drawings. Preferably, the apparatus 11 includes jack means 44 extending downwardly between the carriage means 36.

The raw material supplying portion 13 of the apparatus 11 includes a plurality of reservoirs 46 operatively connected with the supporting portion 12. The reservoirs. are connected independently with the mixing portion 14 through flexible conduit means 47 (FIG. 3). The raw material supplying portion advantageously also includes gravity feed hoppers 48 adjacent the mixing portion 14 and preferably heating means 49 along the length of the flexible conduit means 47.

The supporting portion 12 advantageously includes a cantilever support assembly 51 which extends outwardly therefrom. As shown, the cantilever support assembly 51 extends from one of the upstanding frame members 20–23 and is pivotally connected thereto. Mixing portion 14 and matrix forming portion 15 preferably are adjustably carried by the cantilever support assembly.

The mixing portion 14 of the tubular structure forming apparatus 11 of the invention includes an elongated mixing chamber 52 adjustably disposed on cantilever support assembly 51. The mixing chamber 52 preferably is interconnected with a hopper 48 through an auger 54.

The matrix forming portion 15 of the apparatus 11 includes mixture distributing means 56 adjacent an outlet 57 of the mixing chamber 52. The mixture delivery means 56 may include an elongated trough member 58 with a generally horizontal outlet 59. As shown in the drawings, the trough member 58 preferably includes vertically disposed plate sections 60,61 arranged in a downwardly converging relationship.

A first elongated structure grasping means 63 is disposed adjacent the outlet 59 of the mixture delivery means 56. Advantageously, as shown, grasping means 63 includes cooperating counter-rotating rollers 64 disposed below lower edges of the plate sections 60,61.

Preferably, the mixture distributing means 56 also includes advancing means 66 for moving a structure 67 along a preselected path while the structure is flexible and adhesive. Advancing means 66 as shown in the drawings may include elongated structure grasping means 65 translatably movable along a generally horizontally disposed, frame assembly 68 extending from the supporting portion 12.

The elongated structure grasping means 65 preferably extends between and travels along spaced parallel side rails 69 of the frame assembly 68. Advantageously, the elongated structure grasping means includes a pair of cooperating hinged sections 70. The travel of the grasping means 65 is coordinated to equalize the tension across a structure being advanced along a preselected path.

The mixing portion 14 preferably also includes a second mixing chamber 72 including a plurality of adjacent axially aligned rotatable mixing sections 73,74,75. Advantageously, the orientation of each mixing section is adjustable with respect to that of adjacent mixing sections as shown in FIG. 4.

Although the internal surfaces of the mixing sections usually are smooth, it may be desirable to utilize roughened surfaces, inwardly extending protrusions, e.g. blades, vanes, and the like. With such constructions, it is preferred that means be provided to clean the surfaces periodically. For example, blades or vanes can be retractable to remove any materials adhering thereto. Also, the mixing sections advantageously may be constructed with separable housings 76 including connecting flanges 77 (FIGS. 5 and 6).

The mixing sections 73–75 are operatively connected with slip members 78,79. The sections of the mixing chamber 72 are supported on spaced rollers 80 mounted on adjustable support assembly 81. The second mixing chamber 72 includes independent drive means for each mixing section 73–75. As shown in the drawings, each drive means includes a motor 82 with a sprocket 83 engaging a ring gear 84 either directly or through a chain (not shown). Adjacent an outlet 85 of the second mixing chamber 72 are located a slip-form conical member 86 and an air blower 87.

To form a continuous tubular structure employing the method and apparatus of the invention as shown in the drawings, a liquid reactive resin forming. material is advanced from a reservoir 46 through a conduit 47 into mixing chamber 52. Simultaneously, other minor ingredients e.g. colors, catalysts, etc. from another reservoir (not shown) advance through a conduit into the mixing chamber. At the same time, a particulate solid additive material from hopper 48 enters the rotating mixing chamber 52.

The additive particles are mixed with the liquid resin forming material substantially continuously, preferably in a proportion significantly greater than that of the resin forming material. During this mixing operation, substantially all of the additive particles are encapsulated with the liquid resin forming material to a preselected thickness.

The resulting mixture being delivered from outlet 57 of the mixing chamber 52 passes downwardly through a splitter 88 into trough member 58 where it contacts a moving porous tubular blanket 89 with an inflatable bladder member 90 disposed therein. The mixture is delivered to the trough member at a rate sufficient to form a residual pool therein. As the blanket/bladder combination 91 is pulled downwardly by cooperating counter-rotating rollers 64, part of the mixture migrates through the blanket substantially uniformly to form a continuous resin matrix within the blanket.

The mixture treated blanket then is advanced by first grasping means 63 in a preselected path and placed into a final configuration. The bladder 90 within the blanket 89 is inflated with air blower 87 to form a bladder-lined tubular structure 91 of a preselected configuration.

Alternatively, the treated blanket can be inflated prior to placement into the preselected final configuration. The tubular structure 91 then is transferred to an adjacent preselected location and positioned into a final configuration such as a path or ditch while the structure is flexible and adhesive. When the tubular structure has had time to cure, the air blower 87 is removed leaving a continuous pipe line with structural integrity and long life.

If a very high level of strength is desired, the second mixing chamber 72 is included in the fabrication of the tubular structure described above. A liquid resin forming material and a particulate solid additive material are mixed continuously by adding the ingredients to the rotating mixing chamber 72. As the solid and liquid materials advance from one mixing section 73–75 to the next along the mixing chamber, the mixing of the materials can be influenced by changing the operating parameters within each respective section. For example, the speed of rotation and/or the inclination of a particular section can be changed and also the direction of rotation can be reversed.

FIGS. 5 and 6 illustrate the position of the materials at different points along the mixing chamber 72. FIG. 5 shows the materials within mixing section 74 being rotated in a clockwise direction and FIG. 6 within section 75 in a counter-clockwise direction. In the rotation of each section, as the materials reach a stationary wiper blade 92, the materials are separated from the inner surface of the mixing section and tumble to the bottom of the section. The partially mixed materials traveling upward again into contact with the blade are separated from the inner surface and tumble to the bottom of the section.

The resulting mixture with a high proportion of the particulate solid additive material is applied to the outer surface of a tubular structure 91 after the structure is inflated with air blower 87 and while the structure is flexible and has an adhesive outer surface. The second mixture is applied to the structure 91 as it is advanced through a slip-form conical member 86. After curing, the air blower is withdrawn leaving a high strength outer covering 93 surriounding continuous pipe structure 91 to withstand vehicular traffic.

To produce high quality continuous tubular structures of the invention, it is important that all of the steps be carefully coordinated by control portion 16. The control portion 16 of the structure forming apparatus 11 of the invention includes programmable memory means 94 and actuating means 95 responsive thereto in combination with coordinating means 96 to control the operation of pumps, valves and drives. Preferably, the coordinating means includes a process controller 97 that initiates changes in the flows of materials and speeds of drives to bring variations therein back to the rates specified in the programs present in the memory 94.

This coordination commonly is achieved through the transmission of information such as digital pulses from monitors and/or sensors at the control components to the process controller 97. The operating information is compared with the preselected programming parameters stored in the memory 94. If differences are detected, instructions from the controller change the operation of the components to restore the various operations to the preselected processing specifications.

During the above steps, sensors (not shown) also are sensing the orientation of the mixing sections 73–75. If a deviation is detected in the specifications stored in memory 94, actuating means 95 automatically is energized to return the mixing sections to their preselected orientation.

As shown in FIG. 7, a cross section of a typical structure 91 of the invention includes a thin continuous resin rich upper layer 98 over a thicker central layer 99 including a plurality of encapsulated solid particles 100 e.g. gravel, particles from grinding discarded tires, within a continuous resin matrix 101. The resin matrix extends throughout the structure from the thin resin rich upper layer 98 through particle rich central layer 99 downwardly through blanket 89 and into a thinner resin rich lower layer 102 including a few very small solid particles 103 disposed primarily closely adjacent to the blanket. A plastic film bladder 90 provides an air impervious liner for the structure 91. A covering 93 includes tightly packed resin bonded particles 104.

Normal maneuvering of the continuous structure forming apparatus of the invention to maintain it close to a preselected path ordinarily can be accomplished by increasing the speed of the carriages 36 on one side and/or decreasing the speed of the carriages on the other side. Major transverse changes of direction may be accomplished by pivoting the carriages 36 ninety degrees from the normal operating orientation as shown in FIG. 1 using jacks 44 to raise the carriages off the ground. The apparatus then is moved sideways into a desired position at which point, the jacks 44 again raise the carriages 36 so they can be pivoted back to an orientation parallel to its original position.

The same steps can be employed to move the apparatus around obstacles such as bridges, trees, head gates, etc. To change the width of the apparatus, the two carriages on one side can be pivoted and driven away from or toward the center of the apparatus and thereby lengthen or shorten the adjustable frame sections 25, 27.

The liquid reactive resin forming material employed to produce structures of the invention is selected to be capable of reaction to form the particular resin matrix desired in the final structure. Advantageously, the resin matrix is a thermosetting resin such as a polyurethane or polyester. Should a polyurethane be desired, one reservoir may contain an isocyanate and another reservoir may contain a polyol.

More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be premixed with one of the resin formers, e.g. fillers, reinforcements, colors and the like.

The particulate solid additive material is mixed with the liquid reactive resin forming material substantially continuously, preferably in a proportion significantly greater than that of the resin forming material. The additive particles may be any of a wide variety of inexpensive materials readily available at a particular job site. Natural mineral particulate materials such as sand and gravel normally are available or can be produced simply by crushing rock at the site.

Also, materials such as waste or recycled materials which can be shredded or ground into particles of suitable size can be utilized. Particularly useful are particles formed by shredding or grinding discarded tires. Since the particles are encapsulated with the resin forming material and not saturated therewith, many different waste materials may be employed.

Suitable porous blankets include woven, knit, non-woven structures, etc. The blankets e.g. fabrics, mats, etc. may be formed of continuous or discontinuous fibers, yarns, slit ribbons and similar natural and synthetic fibrous materials. Reinforcing members such as ropes, cables and the like that extend longitudinally and/or transversely of the blanket centerline may be included if desired.

The above description and the accompanying drawings show that the present invention provides a novel method, apparatus and tubular structure which overcome the shortcomings of previous expedients and in addition, provide features and advantages not found in earlier technology.

The tubular structure produced with the method and apparatus of the invention can include major proportions of recycled, waste or other materials which are readily available at a job site. These tubular structures are of high quality and may exhibit properties not usually found in products formed with conventional ingredients.

The method of the invention may be conducted by individuals with only limited mechanical skills and experience to produce high quality structures safely and efficiently. The method can be modified to form a variety of different structures. Variations in configuration, composition, physical dimensions and surface appearance, etc. can be achieved easily. Even with such changes, uniformity and high quality can be maintained without difficulty.

It will be apparent that- various modifications can be made in the particular method, apparatus and tubular structure described in detail above and shown in the drawings within the scope of the present invention. The method steps, apparatus components and types of materials employed can be changed to meet specific process and structural requirements. For example, the number and disposition of porous blankets can be different.

These and other changes can be made in the method, apparatus and tubular structure of the invention provided the functioning and operation thereof are not adversely affected. Therefore, the scope of the present invention is to be limited only by the following claims.

What is claimed is:

1. A method of forming a very high strength continuous tubular structure including the steps of preselecting a liquid reactive resin forming material, a particulate solid additive material, a porous tubular blanket and an inflatable bladder member disposed within said tubular blanket, mixing said additive particles with said liquid resin forming material substantially continuously to form a substantially uniform mixture thereof, encapsulating substantially all of said additive particles with said liquid resin forming material, advancing said tubular blanket/bladder combination through said liquid resin/additive mixture, migrating part of said mixture through said blanket substantially uniformly to form a continuous resin matrix within said blanket, advancing said mixture-treated blanket along a preselected path, inflating said bladder member within said treated blanket to form a bladder-lined tubular structure of a preselected cross section, placing said inflated tubular structure into a preselected final configuration while said structure is flexible and has an adhesive outer surface, forming a second resin/additive mixture with a high proportion of particulate solid additive material by tumbling said materials along a cylindrical path in a preselected orientation, reversing the direction of said tumbling as said materials advance along said cylindrical path, changing the orientation of said cylindrical path along preselected sections thereof, monitoring the orientation of said cylindrical path sections and adjusting the orientation to maintain said sections within preselected specifications, applying said second resin/additive mixture to said inflated tubular structure as it is being placed into a preselected final configuration to produce a continuous pipe structure with a high strength outer covering to withstand vehicular traffic.

2. A method of forming a continuous tubular structure according to claim 1 including adding materials along preselected sections of said cylindrical path.

3. A method of forming a continuous tubular structure according to claim 1 including applying said second resin/additive mixture to said inflated tubular structure in a preselected thickness.

4. A method of forming a continuous tubular structure according to claim 1 including the step of applying pressure to said structure after it is positioned in a preselected final configuration.

5. Mobile continuous very high strength tubular structure forming apparatus including a supporting portion, a raw material supplying portion, a mixing portion, a matrix forming portion and a control portion; said supporting portion including a plurality of spaced upstanding frame members of adjustable length, a plurality of generally horizontally disposed frame sections joining adjacent upper ends of said upstanding frame members, one pair of opposed frame sections being of adjustable length, support sections extending between said adjustable opposed pair of said frame sections, pivotable carriage means extending downwardly from lower ends of said upstanding frame members; said raw material supplying portion including a plurality of reservoirs operatively connected with said supporting portion, said reservoirs being connected independently with said mixing portion through flexible conduit means; said mixing portion extending from said supporting portion adjacent an upstanding frame member, said mixing portion including an elongated mixing chamber adjustably disposed adjacent said supporting portion; said matrix forming portion including mixture distributing means extending adjustably downwardly from said mixing chamber and being disposed adjacent an outlet thereof, said matrix forming portion including a trough chamber with vertically disposed plate sections arranged in a downwardly converging relationship, elongated structure grasping means disposed adjacent said mixing chamber outlet and spaced therefrom, gas pressure means disposed adjacent said structure grasping means selectively engageable with a bladder member within a structure to inflate said structure into a preselected tubular configuration, said mixing portion including a second mixing chamber including a plurality of adjacent axially aligned rotatable mixing sections operatively connected with slip members, independent drive means rotating each of said mixing sections about a central axis, positioning means adjusting the orientation of each mixing section with respect to adjacent mixing sections, second mixture distributing means delivering a second mixture to said inflated tubular structure as it is being placed in a final configuration; said control portion including programmable memory means, coordinating means, sensing means, actuating means, and circuitry transmitting signals from said sensing means to said coordinating means for comparison with said memory means and activation of said actuating means to form a high strength outer covering surrounding a continuous tubular structure to withstand vehicular traffic.

6. Mobile continuous tubular structure forming apparatus according to claim 5 including means for advancing said structure along a preselected path while said structure is flexible and adhesive.

7. Mobile continuous tubular structure forming apparatus according to claim 6 wherein said means for advancing said structure along a preselected path extends from said supporting portion.

8. Mobile continuous tubular structure forming apparatus according to claim 7 wherein said structure advancing means includes elongated structure grasping means translatably movable along a generally horizontally disposed frame section.

9. Mobile continuous tubular structure forming apparatus according to claim 8 wherein said elongated structure grasping means extends between and travels along spaced parallel side rails of said frame section.

10. Mobile continuous tubular structure forming apparatus according to claim 7 wherein said elongated structure grasping means includes a pair of cooperating hinged sections.

11. Mobile continuous tubular structure forming apparatus according to claim 5 wherein said matrix forming portion includes adjustable counter-rotating rollers disposed below lower edges of said trough chamber plate sections.

* * * * *